(12) United States Patent
Reim

(10) Patent No.: US 7,079,042 B2
(45) Date of Patent: Jul. 18, 2006

(54) SYSTEM FOR PROVIDING ILLUMINATED DISPLAYS ON A VEHICLE TIRE OR WHEEL ASSEMBLY

(75) Inventor: Kevin R. Reim, Simpsonville, SC (US)

(73) Assignee: Michelin Recherche et Technique S.A. (CH)

( * ) Notice: Subject to any disclaimer, the term of this patent is extended or adjusted under 35 U.S.C. 154(b) by 131 days.

(21) Appl. No.: 10/741,215

(22) Filed: Dec. 19, 2003

(65) Prior Publication Data

US 2005/0134475 A1    Jun. 23, 2005

(51) Int. Cl.
*G08B 5/22*    (2006.01)
(52) U.S. Cl. .............................. 340/815.45; 340/425.5
(58) Field of Classification Search ........... 340/815.45, 340/425.5
See application file for complete search history.

(56) References Cited

U.S. PATENT DOCUMENTS

| | | | | |
|---|---|---|---|---|
| 4,318,436 A | * | 3/1982 | Shurman | 152/523 |
| 5,057,827 A | * | 10/1991 | Nobile et al. | 345/31 |
| 5,748,157 A | * | 5/1998 | Eason | 345/31 |
| 5,903,224 A | * | 5/1999 | Reynolds | 340/815.45 |
| 6,072,386 A | * | 6/2000 | Yu | 340/432 |
| 6,193,384 B1 | * | 2/2001 | Stein | 362/96 |
| 6,257,675 B1 | * | 7/2001 | Leynaert | 301/37.23 |
| 6,265,984 B1 | * | 7/2001 | Molinaroli | 340/815.4 |
| 6,492,963 B1 | * | 12/2002 | Hoch | 345/39 |
| 6,641,041 B1 | * | 11/2003 | Olds et al. | 235/454 |
| 2003/0209063 A1 | | 11/2003 | Adamson et al. | |
| 2005/0104738 A1 | * | 5/2005 | Todorov | 340/815.4 |

* cited by examiner

*Primary Examiner*—Jeffery Hofsass
*Assistant Examiner*—Eric Blount
(74) *Attorney, Agent, or Firm*—Dority & Manning, P.A.

(57) ABSTRACT

A system for providing illuminated displays on a vehicle or wheel assembly includes one or more tire marking devices for integration with tire sidewalls or vehicle wheels. Such tire marking devices may include a plurality of point lights sources (such as LEDs or OLEDs operating at one or more wavelengths) arranged in a predetermined array configuration, a microprocessor coupled to each of the plurality of point light sources, a power source for powering the microprocessor and/or other device elements, and a timing sensor configured to provide one or more timing signals to the microprocessor. The timing signals generated by the timing sensor preferably include sufficient information to determine the rotational rate and relative position of the plurality of light sources. The microprocessor controls the flash sequence and duration of each point light source in the plurality of point light sources as they travel in a rotational path around the tire or wheel to which they are mounted. The flash sequence and duration of each point light source is determined as a function of the rotational rate and position of the tire or wheel assembly as obtained from the timing sensor.

4 Claims, 11 Drawing Sheets

SYSTEM FOR PROVIDING ILLUMINATED DISPLAYS ON A VEHICLE TIRE OR WHEEL ASSEMBLY

BACKGROUND OF THE INVENTION

Many well-known examples of providing light assemblies on cars, trucks, motorcycles, or other vehicles exist. For instance, flashing lights have been provided on emergency vehicles such as ambulances, fire trucks, police vehicles, and the like for a number of years. Such types of light assemblies often serve a purpose of identifying the type of vehicle with which it is integrated or as a safety precaution to alert other vehicles of the presence of an emergency vehicle or other specialized vehicle.

Recent technological advances have furthered the provision of light assemblies on vehicles other than just emergency or other specially designated vehicles. More particularly, a recent interest has developed in integrating light assemblies at varying locations on passenger vehicles for aesthetic purposes. A relatively high level of consumer interest exists in providing visual effects via light assemblies on a wide variety of passenger vehicles.

One exemplary known light assembly corresponds to a TireFlys brand light emitting diode (LED) product for automotive and/or motorcycle wheels. Such product corresponds to a relatively simple device containing a motion sensor, timing circuit, battery and LED. They are configured for operation as a valve stem cap that threads onto a tire valve and flashes the LED when the tire is in motion. Depending on the length of the LED flash duration and the rotational rate of the tire, visual effects corresponding to various lengths of lighted arcs around the wheel are created. TireFlys brand LED devices are known to typically be offered for sale in pairs and in a variety of functional colors.

In light of recent desires for vehicle lighting features, the present invention concerns improved light assemblies for integration with a vehicle tire or wheel assembly.

SUMMARY OF THE INVENTION

An improved system for providing illuminated displays on a vehicle tire or wheel assembly has been developed in accordance with aspects of the present invention. Light assemblies, often referred to herein as tire marking devices, are designed for integrated positioning on a tire or wheel assembly to provide a visual image such as an illuminated logo, graphic, or message. Such visual images may be created for aesthetic purposes and/or for safety reasons.

In accordance with more particular aspects of the disclosed technology, it is an object of some embodiments of the present subject matter to provide a tire marking or illumination device with various options for mounting and positioning the device to effect desired device operation. For example, an illumination device in accordance with some embodiments is positioned along and integrated with a tire sidewall, while in other embodiments an illumination device is positioned on a vehicle wheel or rim portion. Exemplary features for integrating an illumination device to such tire or wheel locations may correspond to adhesives, mechanical fasteners, molded formations, fused rubber patches, etc.

It is an aspect of some exemplary embodiments of the disclosed technology to provide a tire marking or illumination device that includes a plurality of point lights sources (such as LEDs or OLEDs) arranged in a predetermined array configuration and configured to provide a generally uniform illuminated display. For example, a transparent or semitransparent material layer may be provided over the array of point light sources to diffuse the light emitting from each point light source so that the material appears more uniformly lit. Some embodiments of the present subject matter additionally include multiple strands of fiber optic material between each point light source and the aforementioned material layer to additionally distribute the point light sources to achieve more uniform visual displays. Generally uniform visual displays may typically correspond to illuminated logos or graphics.

An aspect of other exemplary embodiments of the present subject matter concerns providing specialized illumination schemes for a plurality of point lights sources (e.g., LEDs). Specialized illumination schemes may yield such visual displays as scrolling graphics or messages as a tire is in a rotational state. More particularly, as an array of point light sources (often configured in a linear array) travels in a rotational path around a tire or wheel assembly, a microprocessor and timing sensor function to determine and control a flash sequence and duration for each point light source in the array, while taking into account the rotational rate and position of the tire or vehicle wheel. As tire or wheel rotation increases, the sweep rate of the light array increases as well, eventually causing the human eye to interpret the sequence of flashing point light sources as a continuously lit image.

Referring now to some particular exemplary embodiments of the subject technology, an illumination device in one exemplary embodiment may include a plurality of point light sources (such as LEDs or OLEDs operating at one or more wavelengths) arranged in a predetermined array configuration, a microprocessor coupled to each of the plurality of point light sources, a power source for powering the microprocessor and/or other device elements, and a timing sensor configured to provide one or more timing signals to the microprocessor. The timing signals generated by the timing sensor preferably include sufficient information to determine the rotational rate and relative position of the plurality of light sources.

Another exemplary embodiment of the present subject matter corresponds to a tire assembly with one or more integrated self-powered lighting assemblies. Such a tire assembly may include a pneumatic tire structure and at least one tire marking device. The pneumatic tire structure is characterized by a crown having an exterior tread portion for making contact with a ground surface, bead portions for seating said tire to a wheel rim, and exterior sidewall portions extending between each bead portion and the crown. The at least one tire marking device may be integrated at selected exterior sidewall locations of the pneumatic tire structure and is configured to provide lighted visual display on selected sidewall surfaces of the tire structure while the tire is stationary and/or in motion. The at least one tire marking device preferably includes a plurality of point light sources configured in a predetermined array configuration. In other exemplary tire assembly embodiments, a microprocessor and timing sensor may also be provided.

In accordance with more particular aspects of the aforementioned exemplary tire marking device and tire assembly embodiments, a microprocessor coupled to the point light sources controls the flash sequence and duration of each point light source in the plurality of point light sources as they travel in a rotational path around the tire or wheel to which they are mounted. The flash sequence and duration of each point light source is determined as a function of the rotational rate and position of the tire or wheel assembly as obtained from the timing sensor.

Some tire marking devices in accordance with the present technology may further include such features as a photoactive element for determining the amount of ambient light to which the devices are subjected and/or an RF receiver or transceiver for receiving wireless user input signals. Still further exemplary features concern device support mechanisms. For example, one or more flexible wire structures may interconnect and provide electrical connection to each light source in an array. In other exemplary embodiments, a support substrate is provided to which elements of the tire marking device, such as the point light sources, may be mounted. Such a support substrate may be mounted with an optional foam adhesive layer to further provide isolation from tire stresses and support for the tire marking device.

A still further exemplary embodiment of the disclosed technology corresponds to a control system for interfacing with one or more tire marking devices integrated with a tire or wheel assembly. Such a control system may include, for example, an input interface (such as a keypad) configured for user selection of visual display options for one or more associated tire marking devices, a microprocessor coupled to the input interface and configured to control various elements of the control system, a power source for providing power to elements of the control system, and a transmitter configured to transmit RF signals to one or more associated tire marking devices. Such a control system may further include a display for providing visual output and confirmation of selection input to a user. An audio input may also be included for coupling to a vehicle audio head unit to synchronize tire marking device illumination to vehicle audio signals.

Additional objects and advantages of the present subject matter are set forth in, or will be apparent to, those of ordinary skill in the art from the detailed description herein. Also, it should be further appreciated that modifications and variations to the specifically illustrated, referred and discussed features and steps hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in this summarized section, may include and incorporate various combinations of aspects of features, components, or steps referenced in the summarized objectives above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 1:
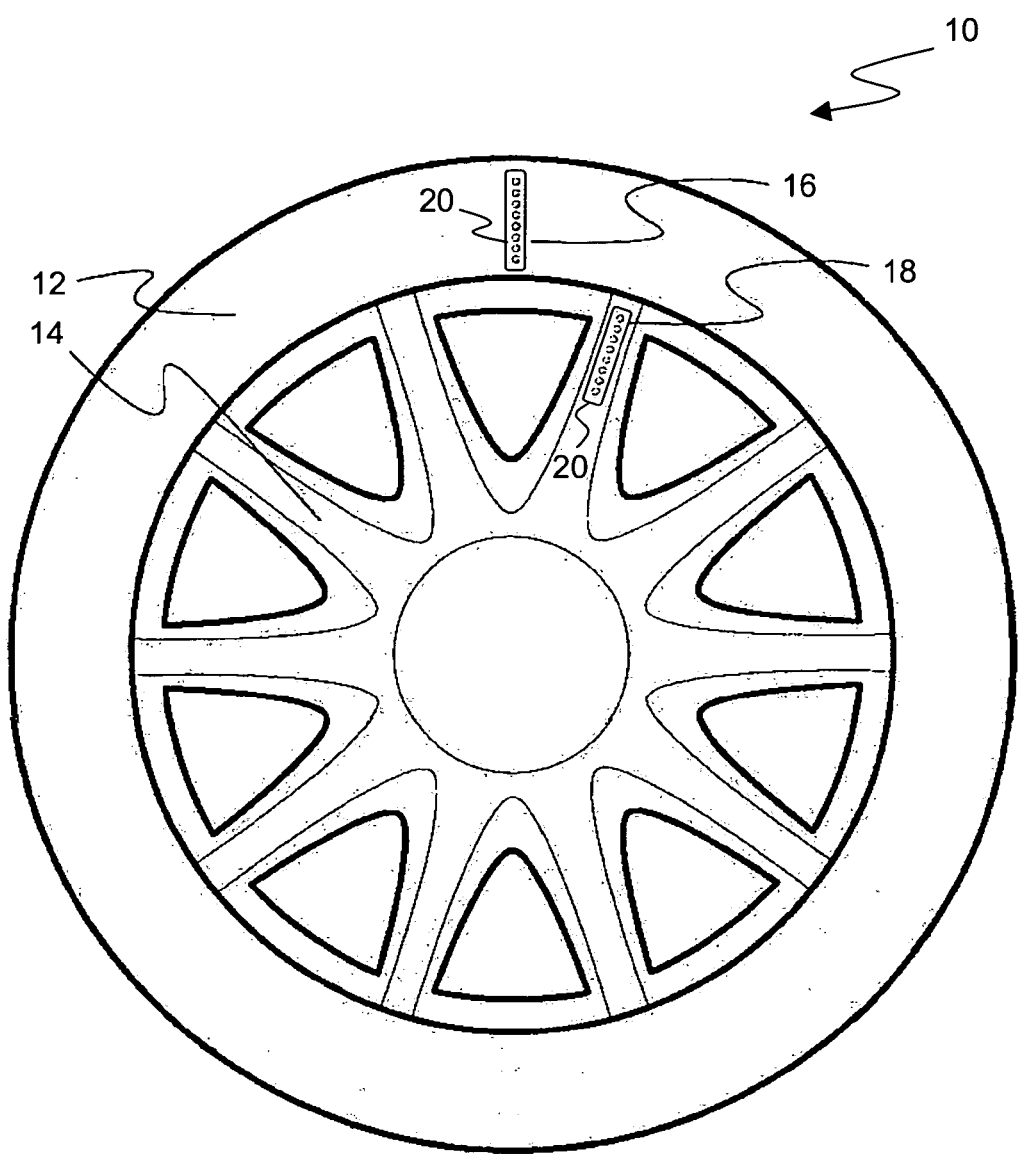
FIG. 1 displays an exemplary embodiment of a tire/wheel assembly illustrating two exemplary locations for integrating an electronic tire marking device in accordance with select aspects of the present invention.

Repeat use of reference characters throughout the present specification and appended drawings is intended to represent same or analogous features or elements of the invention.

DETAILED DESCRIPTION OF THE PREFERRED EMBODIMENTS

As discussed in the Summary of the Invention section, the present subject matter is particularly concerned with a Light Emitting Diode (LED) tire marking device for integration with a tire or wheel assembly. Such an LED electronics package includes an LED array and corresponding circuitry configured for device operation synchronized to the rotation of the tire or wheel assembly with which the package is integrated.

Figure 2:
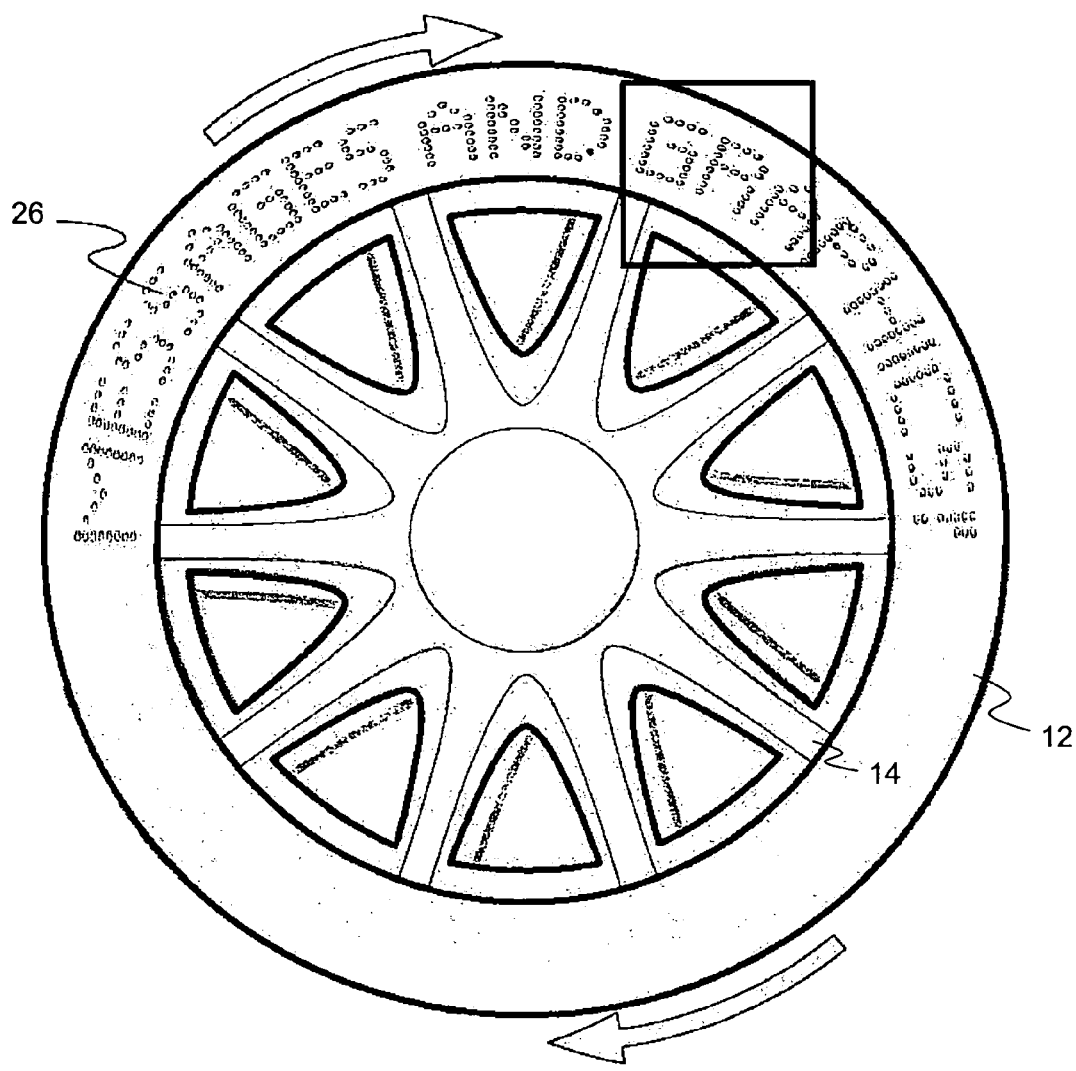
FIG. 2 provides an exemplary illustration of resultant visual display when the exemplary tire/wheel assembly with integrated tire marking device of FIG. 1 is in motion.
Figure 3:
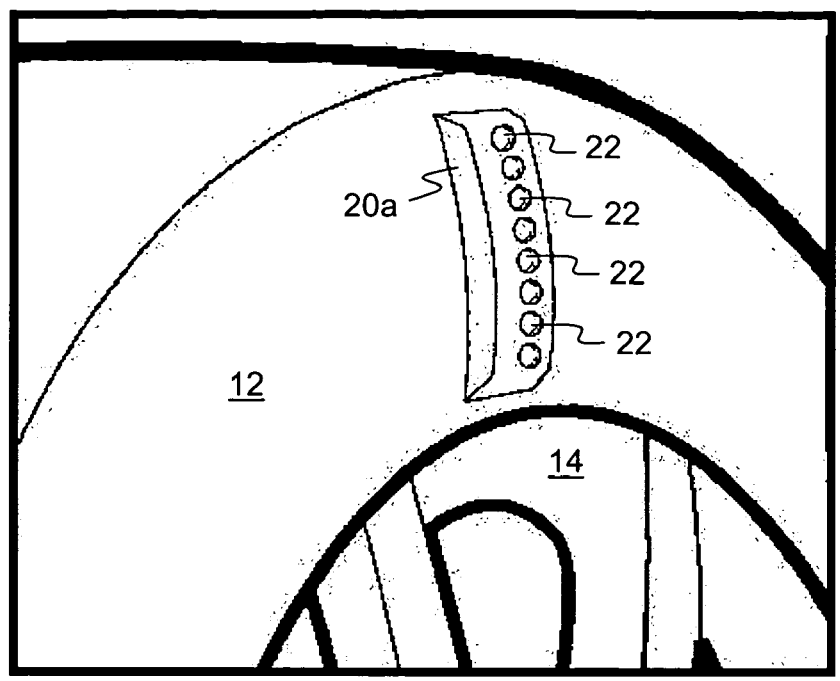
FIG. 3 provides a detailed view of a first exemplary LED array portion of a tire marking device in accordance with select aspects of the present invention.
Figure 4:
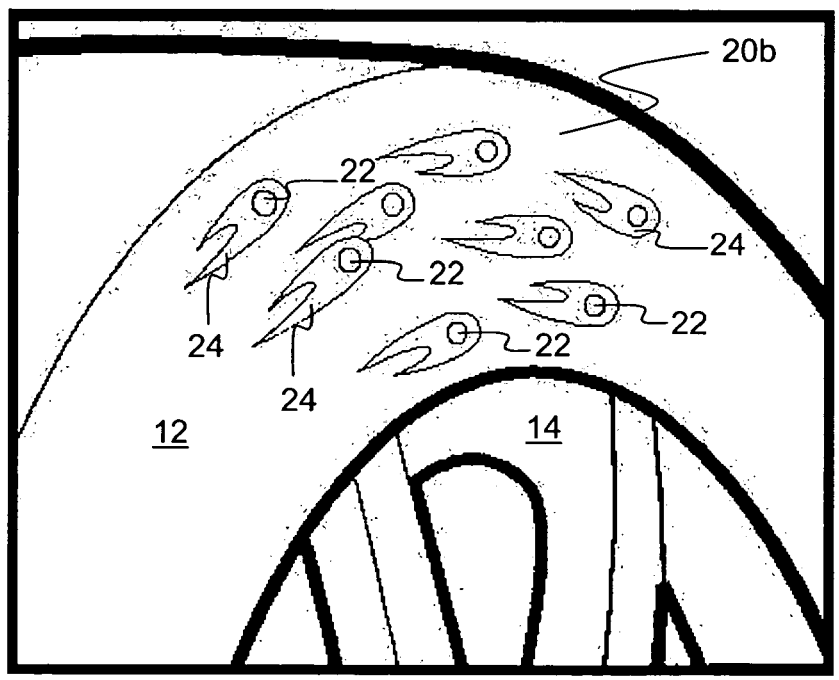
FIG. 4 provides a detailed view of a second exemplary LED array portion of a tire marking device in accordance with select aspects of the present invention.
Figure 5:
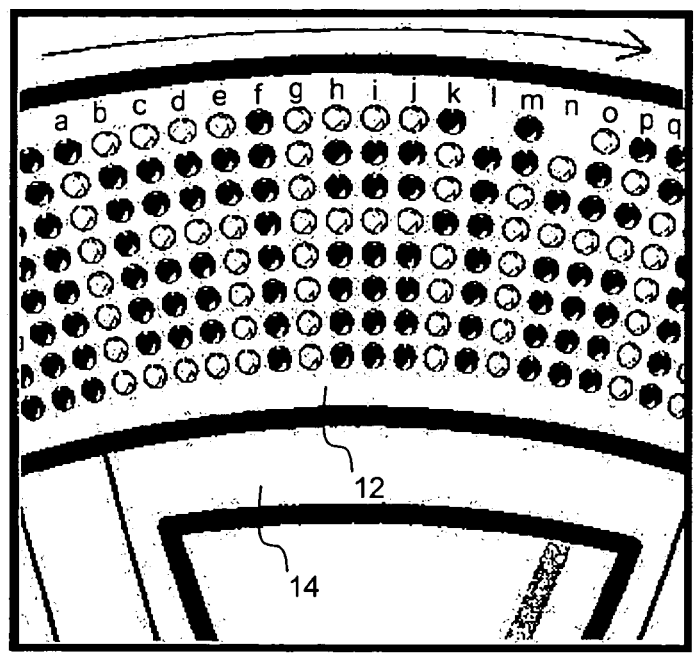
FIG. 5 provides a detailed view of an exemplary LED flash sequence utilized to produce the exemplary visual display depicted in FIG. 2.
Figure 9:
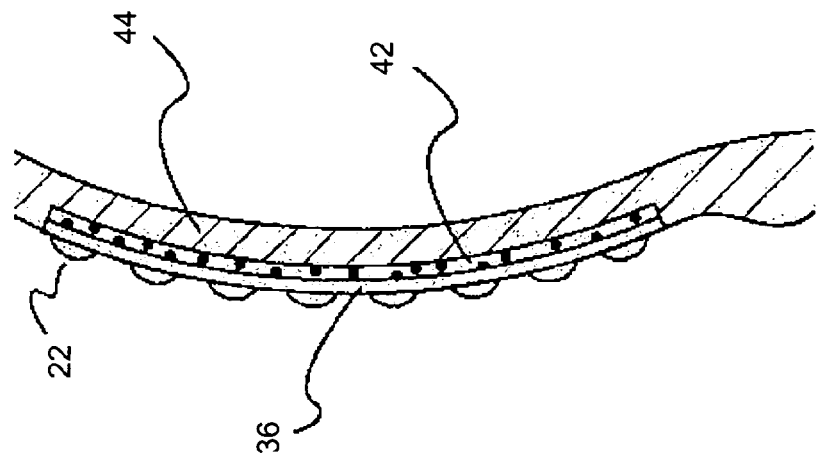
FIG. 9 displays an exemplary tire sidewall cut with integrated LED array in accordance with select aspects of the present invention.
Figure 11:
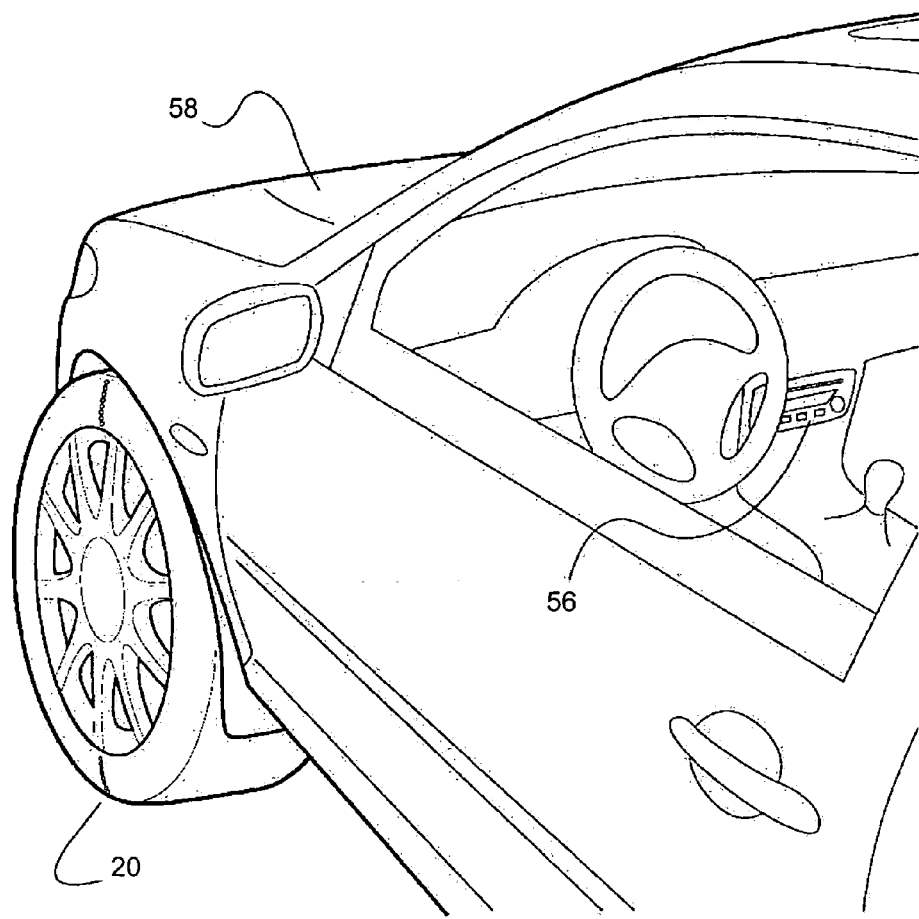
FIG. 11 illustrates exemplary aspects of integrating and interfacing a tire/wheel assembly with exemplary integrated tire marking device in accordance with the present invention to a vehicle.
Figure 12:
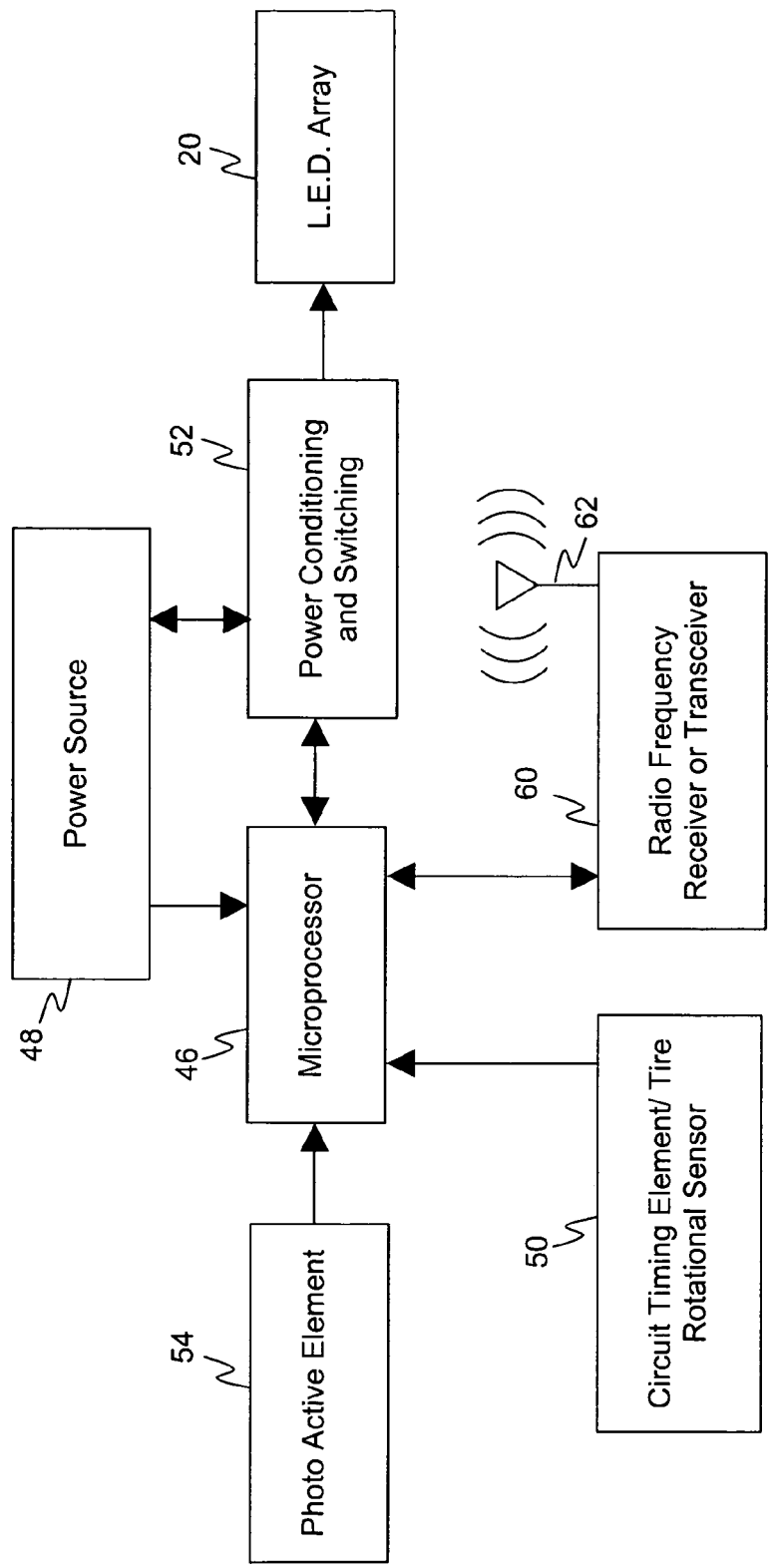
FIG. 12 provides a schematic block diagram of a tire marking device including an LED array in accordance with aspects of the present invention.

An LED tire marking device in accordance with the present invention may correspond to a variety of particular configurations, examples of which are presented in FIGS. 3 and 4. Such configurations are provided in specific arrangements relative to a radial and circumferential mapping of a tire sidewall exterior or wheel rim, aspects of which are presented with reference to FIGS. 1, 6 and 7. Additional aspects of mounting the subject LED arrays to an exemplary tire location are illustrated in FIGS. 8 and 9, and different embodiments for exemplary positional iterations of the subject LED arrays are depicted in FIGS. 10–10D, respectively. A preprogrammed algorithm for controlling the flash sequence and duration of LED illumination determines the resultant visual display effected by the LED array, as illustrated in FIGS. 2 and 5. Such algorithm may be implemented by a microprocessor and timing mechanism, which may be part of additional circuitry associated with the subject LED arrays in an LED electronics package such as illustrated in FIG. 12. Features for interfacing with an exemplary tire marking device of the present invention, such as provided in a vehicle interior, are generally depicted in FIG. 11 and more particularly discussed with reference to FIG. 13.

Selected combinations of the aforementioned aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function. Similarly, certain process steps may be interchanged or employed in combination with other steps to yield additional exemplary embodiments of a method for generating electric power from a rotating tire's mechanical energy.

Reference will now be made in detail to the presently preferred embodiments of the subject LED arrays and corresponding circuitry of a tire marking device. Referring now to the drawings, FIG. 1 provides a generally side view of an exemplary vehicle wheel assembly 10 which includes a pneumatic tire structure 12 seated to a wheel rim 14. An electronic tire marking device including an LED array 20 configured for operation in accordance with the presently disclosed technology is positioned relative to wheel assembly 10, such as in a first exemplary location 16 extending in a generally radial alignment along the exterior sidewall portion of tire 12. Another exemplary location 18 for positioning an LED array 20 in accordance with the present subject matter corresponds to a predetermined portion of a wheel rim 14. In some embodiments, LED arrays mounted on a wheel rim may preferably be positioned in one or more locations towards the outer circumference of the wheel rim 14.

Referring now to FIG. 3, one exemplary configuration for the LED array portion 20 of a tire marking device in accordance with the presently disclosed technology corresponds to positioning a single column of LEDs 22 extending in a generally radial fashion along a tire sidewall. Although eight individual LEDs 22 are illustrated in the exemplary columnar LED array 20a of FIG. 3, it should be appreciated that any particular number of LEDs 22 can be provided, and thus the number of LEDs should not form a particular limitation of the presently disclosed embodiments.

Yet another exemplary configuration for the LED array portion of a tire marking device is illustrated in FIG. 4, which depicts an array of individual LEDs 22 provided in a predefined offset pattern from one another. Such an offset pattern may be customized to achieve different design effects during operation of the subject tire marking device, and can be provided in a variety of different particular array configurations. Each LED 22 in the exemplary LED array of FIG. 4 may be embedded in a respective molded portion 24 of tire 12, which serves to further embed the LED in tire 14 as well as providing an aesthetic camouflage for the presence of each LED 22 along the tire sidewall. Molded portions 24 may be designed, for example, in a flamed or water droplet design, or in any other variety of fashions.

An LED tire marking device in accordance with the present subject matter may be designed such that each LED 22 in an LED array 20 illuminates when a vehicle tire is in a stationary position. Alternatively, the respective LEDs 22 in an LED array may selectively illuminate in a sequential or rotating pattern to provide the appearance of motion among a stationary LED display. However, more particular functionality of the subject tire marking devices is realized by programmed selective illumination of each LED 22 in an LED array during rotation of a tire. During tire rotation, the array of LEDs 22 provided on a tire or wheel as part of the subject tire marking devices, is continually swept over the same path. During this continuous sweeping motion during tire rotation, a microprocessor coupled to the LED array 20 may be programmed to rapidly change the arrangement of lit LEDs in sequence with the rotational rate of the tire to create the appearance of a text message or moving graphics. The visual effect created by selective illumination of rotating point light sources relies on natural characteristics of the human eye to interpret the repeated swept path of blinking light sources as one continuous image. This phenomenon is known as "persistence of vision," and is realized in such related instances as the way the human eye sees pixels on a computer screen, a sequence of frames at a movie theater, or even pulsed frequency of fluorescent lights and perceives such light sources as continuous respective images. Other more particular applications that utilize aspects of the persistence of vision phenomenon are realized in Fantazein brand clock and wand products.

An example of the way such images are visually realized during tire rotation is provided in FIG. 2. Referring now to FIG. 2, when wheel 14 and the tire 12 seated thereto is rotated around the wheel axle at a substantial speed, a rotating LED tire marking device 20 such as illustrated in FIG. 1 at position 16 along the sidewall of tire 12 can be configured to create a specified graphic result 26 during tire rotation. The graphic result 26 can be a simple text message or a colorful animated scene.

More particular aspects of the exemplary visual display depicted in FIG. 2 is illustrated in FIG. 5. The view of FIG. 5 represents a moving tire 12 and wheel rim 14, showing a plurality of sequential locations at which a radially configured columnar LED array 20 (such as LED array 20a of FIG. 3) might be positioned during tire rotation. For example, a column of eight LEDs originally at position a changes positions every fraction of a second to subsequent consecutive positions b, c, d, . . . , o, p, q continuing around the entire radius of a tire. Although eight LEDs are presented in this example, it should be appreciated that many other specific number of LEDs (e.g., 4, 6, 7, 8, 9, 10, etc.) may be employed, and thus the number of LEDs in such an array should not be considered a limitation of the present subject matter. The LED array can change its illumination sequence and duration depending on its position relative to the tire while in a rotational state. On/off light sequencing during tire rotation can create images across the tire circumference using one or more LED arrays. For instance, the illumination patterns of the LED array when in positions a through e can be configured to flash a design corresponding to the letter "G". Similarly, when in positions g through λ, the illumination pattern forms an "R", while in positions m through q the illumination pattern forms an "A". Every time the tire 12 rotates back to exemplary positions a through q, the same illumination patterns can be flashed. If a tire were rotating at 20 Hz, then the letters "G", "R" and "A" or whatever predetermined graphics were configured for display would illuminate 20 times per second. To the visual eye, this would appear to be a substantially continuous graphic image as opposed to the actual intermittent flashing of light. In other illumination pattern examples, a predetermined graphic position can advance positions to give the appearance of a moving image. For example, where the letter "G" in FIG. 5 initially illuminates at positions a through e, after a predetermined number of flashes (e.g., ten successive illuminations, the "G" can then illuminate at positions b through f and then at positions c through g, etc. to create the image of scrolling text.

Figure 10A:
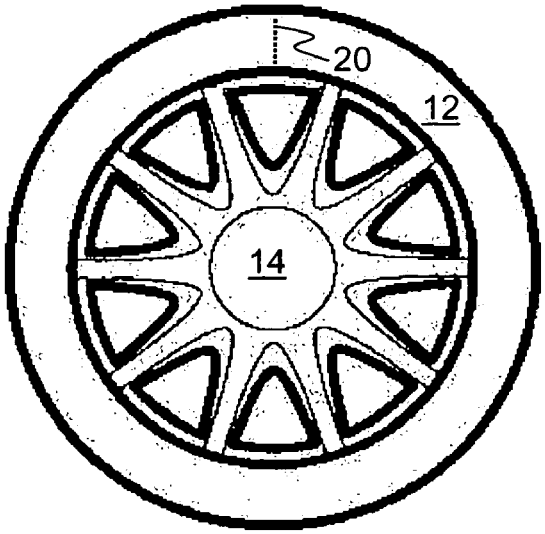
FIGS. 10A, 10B, 10C and 10D respectively illustrate exemplary positional iterations for an LED array portion of a tire marking device in accordance with select aspects of the present invention.
Figure 10B:
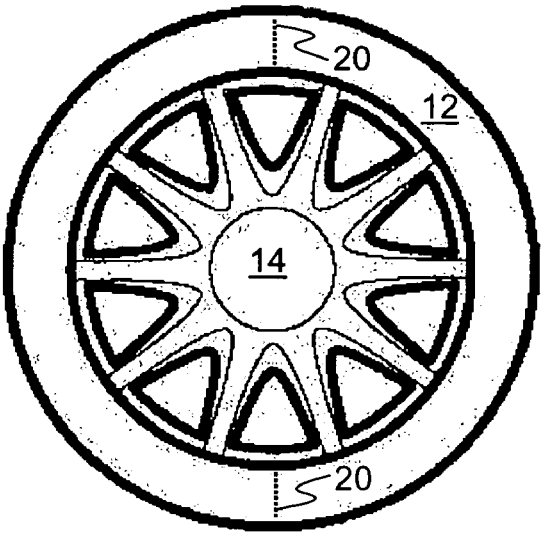
Figure 10C:
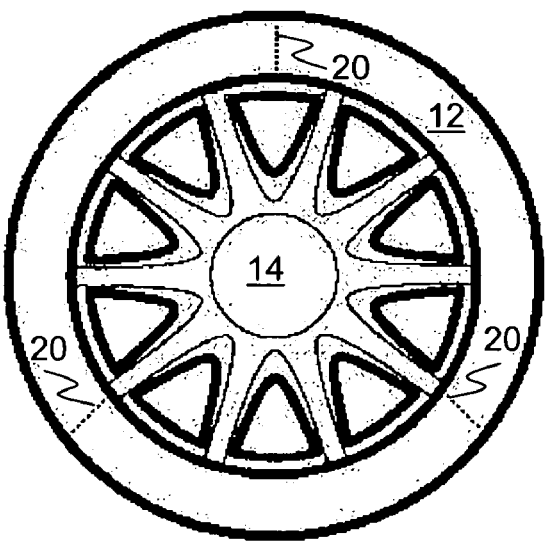
Figure 10D:
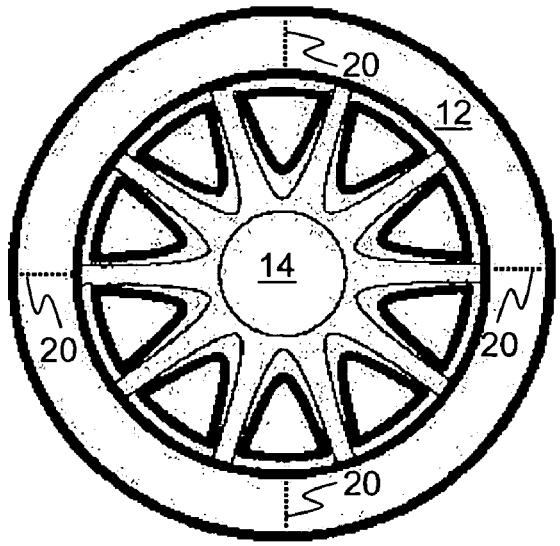

Although the examples illustrated in FIG. 1 and generally discussed above include only a single LED array and corresponding tire marking device, it should be appreciated that additional LED arrays at different positional iterations may also be employed, such as depicted in FIGS. 10A–10D, respectively. One iteration of an LED array 20, such as illustrated in FIG. 10A will allow one sweep of the array for each full rotation of a tire. By adding more LED array iterations, the sweep frequency per rotation can be doubled (as in FIG. 10B), tripled (as in FIG. 10C) or quadrupled (as in FIG. 10D). Provision of multiple LED arrays (and corresponding tire marking device circuitry) translates into obtaining more sweep frequencies with fewer rotations, and allows programmed visual displays to be seen at lower speeds.

Illumination frequencies for the subject devices can be variously predetermined based on intended environmental light conditions. In some exemplary embodiments of the disclosed technology, illumination frequencies of at least about fifteen-sixteen Hz achieve a desired level of visual perception by the human eye, such as in lighting environments consistent with typical indoor artificial light levels. Lower illumination frequencies, such as on the order of about ten Hz, may be visually satisfactory at lower light levels. Generally higher illumination frequencies, such as on the order of 20–30 Hz or higher may be utilized in lighting environments with substantially higher levels of natural and/or artificial light.

Figure 6:
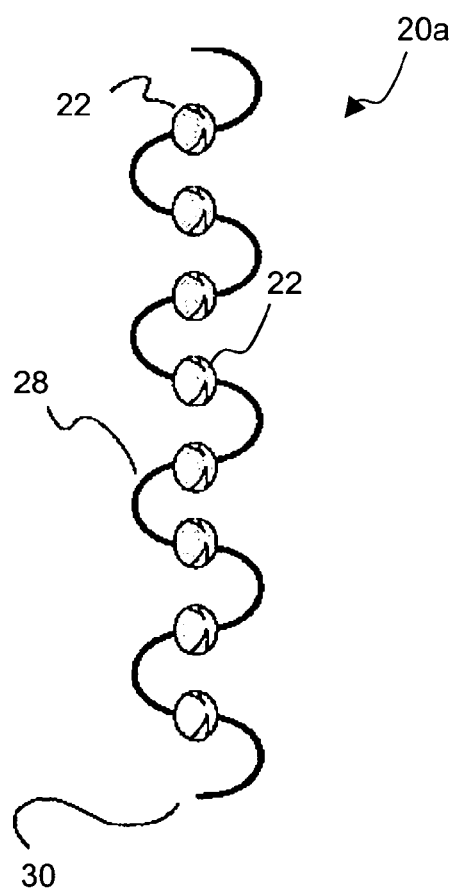
FIG. 6 displays a specific position mapping configuration and an exemplary flexible wire structure for incorporation with the first exemplary LED array of FIG. 3.

Referring now to FIG. 6, an exemplary feature for electrically coupling multiple LEDs 22 in an LED array (such as a columnar array 20a of LEDs) corresponds to a flexible wire structure 28 electrically connected to each LED 22 in the array. Flexible wire structure 28 may be formed, for example, in a generally serpentine fashion (as illustrated) or in a generally helical or coiled fashion, thus accommodating flexing and stretching in all directions. Such a flexible wire structure 28 would help to ensure survival of the subject tire marking devices when subjected to circumferential and radial forces and general stresses associated with tire rotation as well as tire deformation between the tire contact patch at the road or ground surface. As opposed to generally straight wire structures, a flexible wire structure will also help maintain electrical connectivity among distinct LEDs 22 in LED array 20a and also connection of the LED array to additional associated circuitry. One end of flexible wire structure 28 may serve as an electrical lead to such additional circuitry (which may include such elements as a microprocessor and power source or others as illustrated in FIG. 12).

Figure 7:
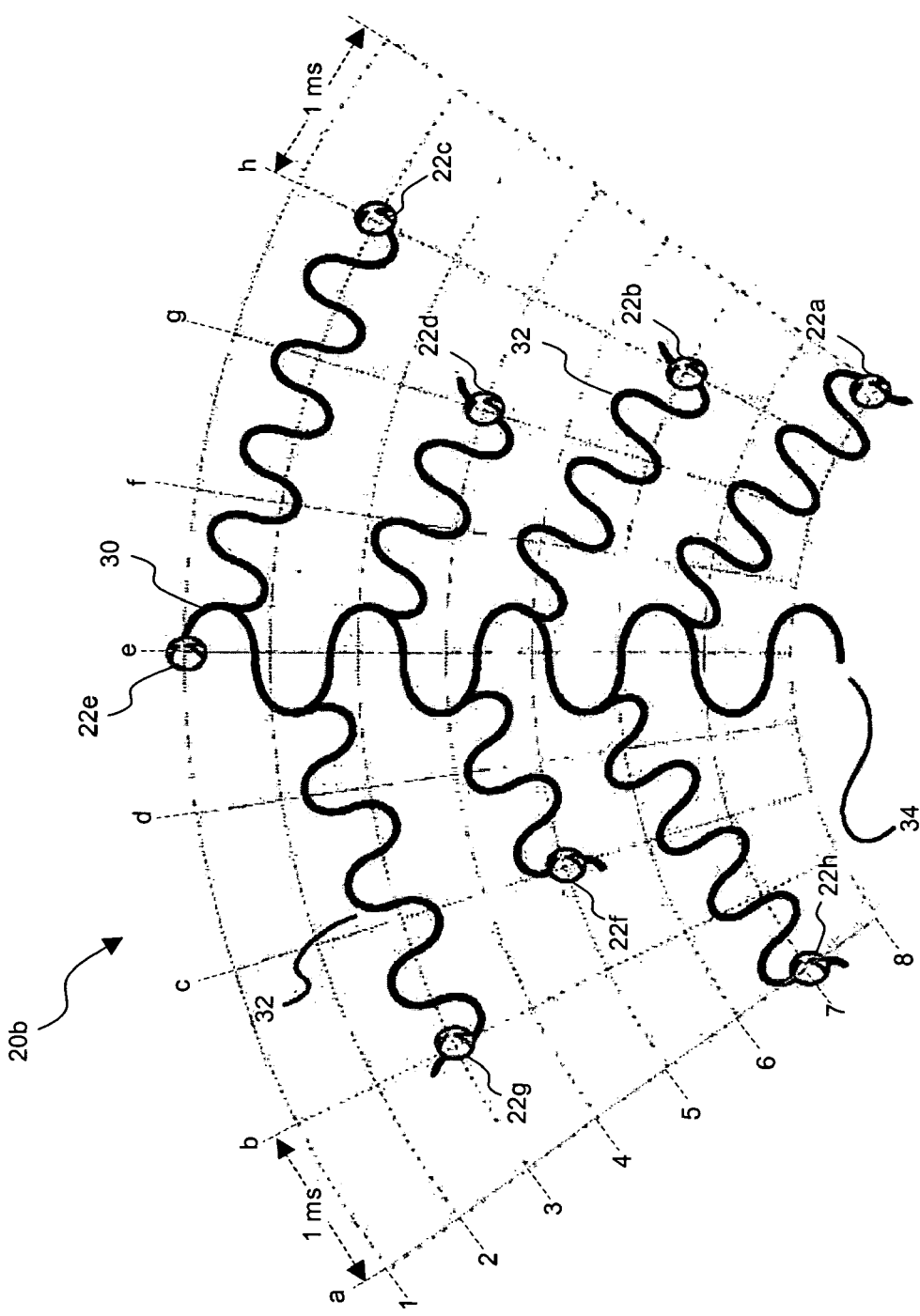
FIG. 7 displays a specific position mapping configuration and an exemplary flexible wire network for incorporation with the second exemplary LED array of FIG. 4.
Figure 8:
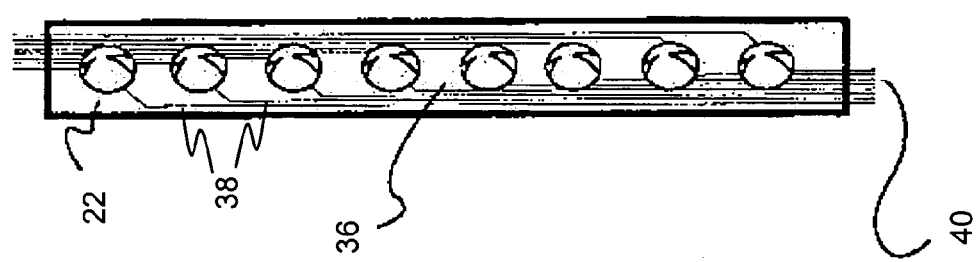
FIG. 8 displays an LED array with an exemplary mounting substrate and wire leads in accordance with select aspects of the present invention.

An example of electrical coupling for a nonlinear LED array such as that of FIG. 4 is illustrated in FIG. 7. A network of flexible wire structures may be arranged in a variety of fashions. One fashion as illustrated in FIG. 7 includes a primary flexible wire structure 30 from which secondary flexible wire structures 32 extend to and are electrically coupled to other LEDs 22 in the scattered LED array 20b. A chosen portion of the interconnected flexible wire structures 30 and 32 may be chosen as an electrical connection 34 to additional circuitry associated with the LED array.

Another aspect of a scattered LED array 20b such as illustrated in FIG. 7 is that each LED array must be mapped to a corresponding position grid in radial and circumferential directions along a tire sidewall. It is important to determine where the LEDs are positioned relative to such a predetermined grid so that illumination patterns can be appropriately determined for such a scattered array. For example, consider the grid arrangement of FIG. 7 with grid references a through i, respectively in the radial direction and grid references 1 through 8, respectively in the circumferential direction, and determination of a corresponding illumination pattern that would make a solid radial line at position i. Assume for exemplary purposes that the time duration it takes to rotate from one radial grid reference to the next (for example, from position a to position b) takes one millisecond (ms). In order to create a radial line at position i, LED 22a (at circumferential grid reference 8) would flash at a given time t, while LEDs 22b and 22c (at respective grid references 6 and 2) would flash at times (t+1) ms, LED 22d (at circumferential grid reference 4) would flash at time (t+2) ms, LED 22e (at circumferential grid reference 1) would flash at time (t+4) ms, LED 22f (at circumferential grid reference 5) would flash at time (t+6) ms, LED 22g (at circumferential grid reference 3) would flash at time (t+7) ms, and LED 22h (at circumferential grid reference 7) would flash at time (t+8) ms.

Reference will now be made to various potential options for mounting an LED tire marking in accordance with the present subject matter to a tire or wheel structure. Before mounting an LED array in accordance with the present technology to any tire or wheel location, it may be desirable in some embodiments to provide a support substrate 36 (such as illustrated in FIG. 8), made of, for example, a printed circuit board material. By providing all the LEDs and wire structures on such a support substrate 36, the subject tire marking devices may more easily withstand the forces and stresses of a tire during rotation. Furthermore, additional features such as circuit traces 28 may also be provided on support substrate 36 from each LED 22, for providing leads 40 to additional circuitry associated with the tire marking device.

As previously mentioned with reference to FIG. 1, an LED tire marking device (specifically the LED array portion thereof) in accordance with the present subject matter may be integrated with either a tire or wheel to which a tire is mounted. If the subject LED arrays are to be mounted on a wheel, the LED array may simply be adhered to the wheel via an adhesive layer or fastened to the wheel by mechanical fastening means such as grooves, snaps, clips, or locking mechanisms. If mounted to a tire, the subject LED arrays may be molded into a tire or affixed to a tire sidewall using chemical adhesion or mechanical interfacing processes. LEDs 22 mounted to a support substrate 36 may alternatively be mounted to a foam adhesive layer 42, as depicted in FIG. 9, for providing additional isolation from tire stresses and additional protection from potential device corrosion due to outward migration of chemicals from certain tire materials. The modular combination of LEDs 22 to support substrate 36 and foam adhesive layer 42 may be adhered to a groove recess in tire sidewall 44 with an interfaced fit for mechanical hold of the LED array. Still further, an LED array may be molded to or placed inside a rubber patch, which may then be fused to a tire sidewall. In accordance with all such possible options for mounting an LED array and corresponding tire marking device to a tire or wheel, the term "integrated" as used herein is intended to encompass all such possible mounting, attachment, or embedding configurations.

Referring now to FIG. 12, additional exemplary circuit components for provision with an LED array 20 to yield a tire marking device in accordance with certain aspects of the present invention will now be discussed. In some embodiments of the present invention, such additional circuitry is provided for each LED array, while in other embodiments, a single module of additional control circuitry may be coupled to all LED arrays provided on a single tire or wheel. Circuitry associated with LED array 20 in some embodiments may preferably include at least a microprocessor 46, power source 48 and a timing mechanism for synchronizing operation of the subject tire marking device to the rotation rate of a tire. Such additional circuit components may be provided in the same general location relative to a tire or wheel as the LED array 20, or may be placed in a different location such as along the tire sidewall close to the tire bead since portions of an inflated tire are generally more rigid in this area. When a tire is in motion, microprocessor 46 will receive input from a timing sensor 50 indicating the rotational rate and corresponding position of the tire. Timing sensor 50 may correspond to a sensor or other element for determining the revolution or rotation rate of a tire, as may be effected for example by an accelerometer or a piezoelectric actuator. Working then from a preset program stored in memory associated with the microprocessor 46, microprocessor 46 will control the illumination sequence and duration of each LED in LED array 20 as it travels in a rotational path around the tire, taking into account aspects of rate and position. As previously discussed, as rotation of the tire increases, the sweep rate of LED array 20 increases as well causing the human eye to interpret an illumination sequence of flashing LEDs as a continuously lit image. Output from timing sensor 50 may also be used to determine when a tire is rotating, such that device operation can be limited to certain minimum rotation thresholds.

Referring still to FIG. 12, a tire marking device in accordance with some embodiments of the present invention may further include a power source 48 for supplying charge to the microprocessor and/or an optional power conditioning and switching module 52. Power source 48 may correspond to a battery, a piezoelectric power generation device, or other power generation or power harvesting device. Power generation devices may be coupled to an energy storage device such as a capacitor (e.g., a super capacitor or an electrolytic capacitor) or to a rechargeable battery (e.g., a rechargeable solid-state or chemical battery). A more particular example of a piezoelectric power generation device may include select aspects as described in commonly owned patent application with U.S. Ser. No. 10/143,535, entitled "SYSTEM AND METHOD FOR GENERATING POWER FROM A ROTATING TIRE'S MECHANICAL ENERGY USING PIEZOELECTRIC MATERIALS" which is incorporated herein by reference for all purposes. Such commonly owned patent application also discloses exemplary power conditioning circuitry, select aspects of which may be employed in the power conditioning and switching module 52 of FIG. 12. Power conditioning and switching module 52 may also include features (such as a transistor network or a programmable gate array) for controlling the LEDs in LED array 20.

The exemplary tire marking device of FIG. 12 may further include a photo active element 54 (e.g., a photodiode) to determine, for example, whether the amount of ambient light to which it is subjected appears to correspond to day or night. Since the LED array 20 and corresponding graphic display is more visible to the human eye in lower amounts of ambient light, output from photo active element may be used to limit operation of the subject tire marking device to nighttime or when the amount of ambient light is below a predetermined threshold. Output from photoactive element 54 may also be utilized as a control input to microprocessor 46 for determining particular power levels for LED array 20 such that the LEDs (or other type of point light source) provides more or less illumination depending on the amount of ambient light registered at photo active element 54.

The microprocessor 46 in a tire marking device may in some embodiments correspond be preprogrammed with one or more desired lighting schemes. For example, memory in microprocessor may provide software instructions for directing switching elements in the power conditioning and switching module 52 to configure LED array 20 for illuminating a predetermined word pattern, such as a company logo, or a predetermined graphic effect, such as fish swimming, horses running, a smiling face, a kaleidoscope-type design, or any other infinite combinations of a predetermined nature. Mathematically formulated algorithms may yield a wide variety of specific type-animated illumination patterns, and also randomly generated illumination patterns. The various predetermined lighting schemes (which may include more than one per tire marking device) can be displayed randomly or in cue during tire operation. In such instance, no specific user interface may be required to communicate with the subject tire marking devices on a vehicle.

In other embodiments of the subject tire marking devices, varied amounts of user selection may be accommodated for selecting a desired illumination pattern for the tire marking devices. For example, input features may be provided via a specialized interface locally on the device (for example, as simple as a button which a user can depress to select one of many illumination sequences or to select a desired pattern for scrolling through a sequence of illumination patterns). A more functional user interface provided locally on the tire marking device may be utilized to input a customized message, or merely to select display of a preprogrammed message or graphics in a random or cued fashion or by user preset preference.

Still further embodiments of the subject tire marking devices may provide additional features for interfacing with the devices and providing optional user input. For example, referring now to FIG. 11, customized message input and display selection interface features for communicating with one or more tire marking devices 20 may be provided via an onboard device control system 56 provided inside a vehicle 58. Onboard device control system 56 and each tire marking device 20 may be provided with respective radio frequency (RF) communication devices to effect wireless communication, for example via Bluetooth or other wireless protocols, among selected tire/wheel assemblies and the centralized onboard device control system 56. In accordance with device interfacing in this particular exemplary embodiment of the present subject matter, an RF receiver or transceiver 60 is provided as part of a tire marking device (see FIG. 12) and coupled to an antenna 62 which facilitates receipt of RF control signals transmitted to the tire marking device from onboard device control system 56 or other interface system.

Figure 13:
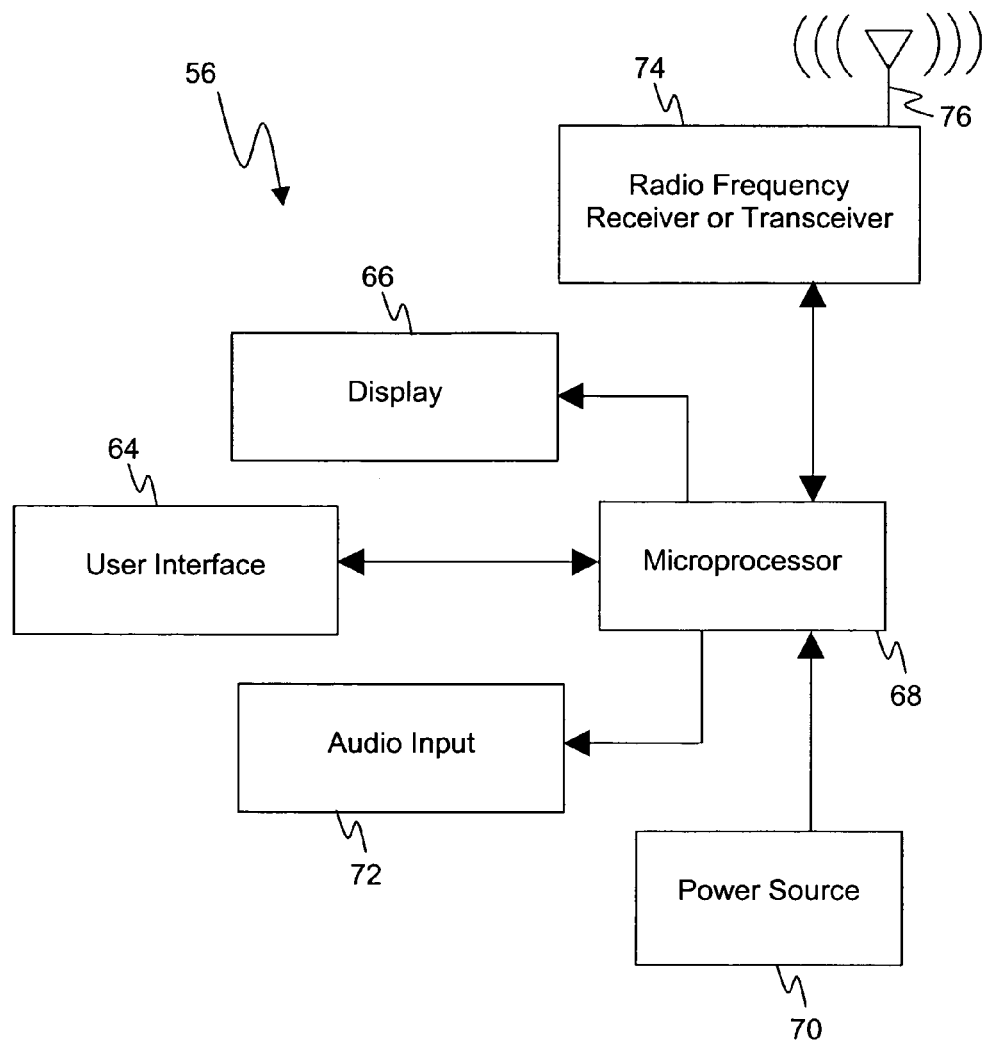
FIG. 13 provides a schematic block diagram of an exemplary onboard device control system for providing user interface features as well as features for communicating with the exemplary electronic tire marking device of FIG. 12.

Referring now to FIG. 13, more particular exemplary features of an onboard device control system 56 are represented in a block diagram depiction. Onboard device control system 56 may include a user interface 64, such as a keypad with one or more selection or function keys. Such a user interface 64 may be employed by a user to select among certain display options that are preprogrammed in a tire marking device, or to specify a customized message, or still further to initiate downloading of new illumination schemes for relay to one or more tire marking devices. A display, such as a liquid crystal display or other display 66 may be provided for visual user confirmation of user input and illumination scheme selections. A microprocessor 68 may also be provided to interface with and control the other elements of onboard device control system 56. Power source 70 may be provided to power microprocessor 68 and/or other elements of onboard device control system 56. Power source 70 may be a separate dedicated power source for the control system 56, such as a rechargeable battery, etc. or may provide power directly from another power source available in vehicle 58 (see FIG. 11). Onboard device control system 56 may further include an audio input 72 coupled from a vehicle's audio head unit such that illumination sequences for the subject tire marking devices may be synchronized with the music playing from the audio head unit. An RF transmitter or transceiver 74 in conjunction with an associate antenna 76 may then wirelessly communicate user input information from the onboard device control system 56 to one or more tire marking devices.

Although exemplary features of the present invention have been described herein with respect to FIGS. 1–13, respectively, it should be appreciated that various modifications to the described tire marking device technology may be employed to achieve enhanced aesthetics and/or performance. One potential modification in accordance with the disclosed technology corresponds to utilizing different point light sources than LEDs in the subject tire marking devices. For example, organic light emitting diodes (OLEDs) may be utilized to achieve better graphics resolution for some applications due to OLED characteristics, including generally smaller size, as compared with conventional LEDs. It is also appreciated that LEDs or OLEDs configured for operation at varied wavelengths may be utilized to achieve a variety of colored graphics or message displays.

Figure 14:
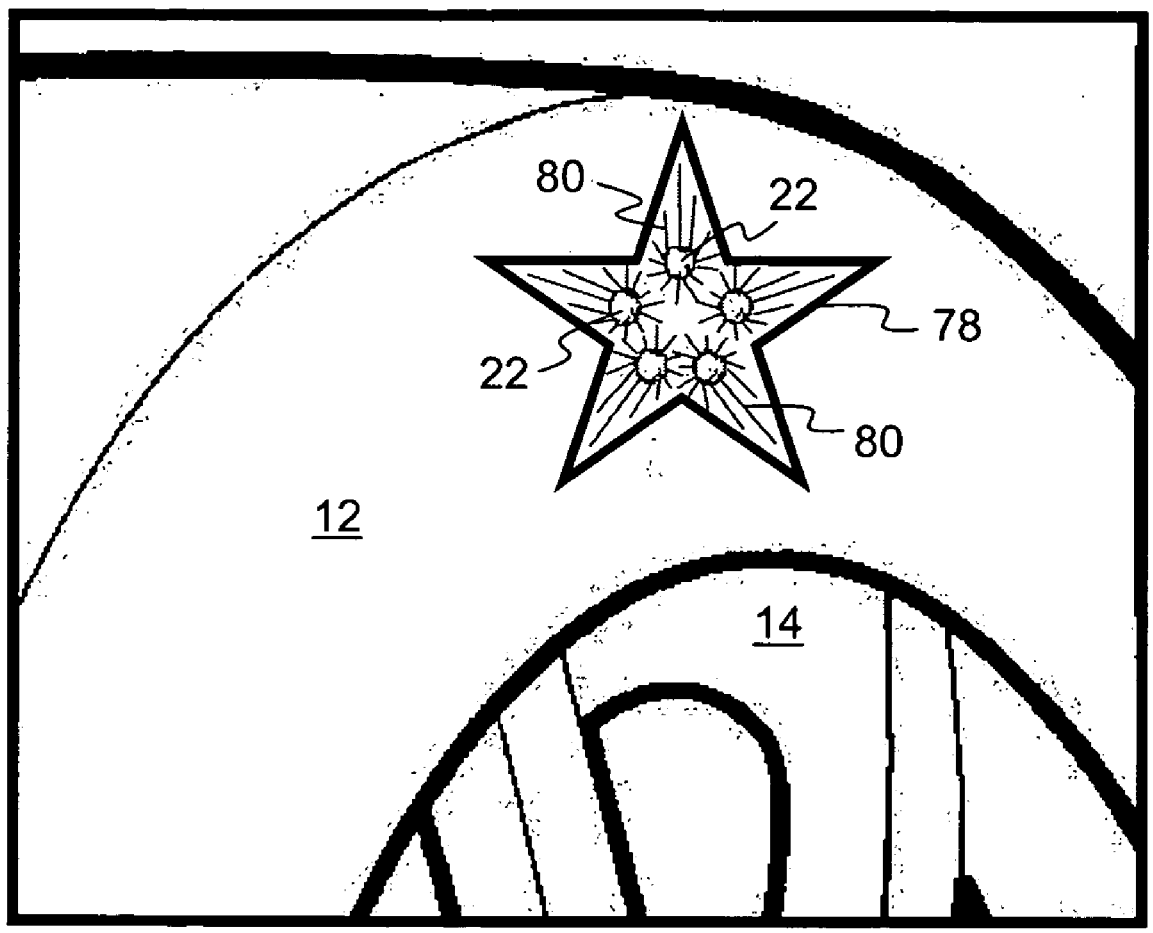
FIG. 14 provides a detailed view of an exemplary LED array portion including light distribution features for a tire marking device in accordance with select aspects of the present invention.

Still further aspects of the presently disclosed technology that may be utilized correspond to creating more of a uniform light display as opposed to a scrolling message or graphic display. For example, referring to FIG. 14, a transparent or semitransparent material layer 78 in the shape of a logo or graphic covering an array of LEDs 22 may be provided to diffuse the light emitting from the LED array and make the illumination appear more uniformly lit. A network of fiber optic branches 80 may also be provided between selected LEDs 22 and the material layer 78 to further distribute the light from each point light source to aid in creating a more uniformly lit graphic.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An illumination device, comprising:
   a plurality of point light sources arranged in a predetermined array configuration;
   a microprocessor coupled to each of said plurality of light sources, said micprocessor configured to determine one or more illumination sequences for said plurality of light sources;
   a power source coupled to and providing power to said microprocessor; and
   a timing sensor comprising one of an accelerometer and a piezoelectric actuator coupled to and providing one or more timing signals to said microprocessor, said one or more timing signals including information to determine the rotational rate and relative position of the plurality of point light sources;
   a material layer applied over selected portions of said plurality of point light sources to diffuse the light emitting from said plurality of point light sources; and
   a network of fiber-optic branches provided between said plurality of point light sources and said material layer.

2. A tire assembly with one or more integrated self-powered lighting assemblies, said tire assembly comprising:
   a pneumatic tire structure characterized by a crown having an exterior tread portion for making contact with a ground surface, bead portions for seating said tire to a wheel rim, and exterior sidewall portions extending between each bead portion and the crown;
   at least one tire marking device integrated at selected exterior sidewall locations of said pneumatic tire structure for providing lighted visual display on selected sidewall surfaces of said pneumatic tire structure;
   a support substrate; and
   a foam adhesive layer for attaching said support substrate to said selected exterior sidewall locations of said pneumatic tire structure and for isolating said at least one tire marking device from stresses associated with said pneumatic tire structure,
   wherein said at least one tire marking device comprises a plurality of point lights sources arranged in a predetermined array configuration and wherein said plurality of point light sources are mounted on said support substrate.

3. A tire assembly with one or more integrated self-powered lighting assemblies, said tire assembly comprising:
   a pneumatic tire structure characterized by a crown having an exterior tread portion for making contact with a ground surface, bead portions for seating said tire to a wheel rim, and exterior sidewall portions extending between each bead portion and the crown;
   at least one tire marking device integrated at selected exterior sidewall locations of said pneumatic tire structure for providing lighted visual display on selected sidewall surfaces of said pneumatic tire structure; and
   a rubber patch provided along selected portions of said at least one tire marking device, wherein said at least one tire marking device comprises a plurality of point lights sources arranged in a predetermined array configuration and wherein said rubber patch is fused to a selected exterior sidewall location of said pneumatic tire structure.

4. A tire assembly with one or more integrated self-powered lighting assemblies, said tire assembly comprising:

a pneumatic tire structure characterized by a crown having an exterior tread portion for making contact with a ground surface, bead portions for seating said tire to a wheel rim, and exterior sidewall portions extending between each bead portion and the crown;

at least one tire marking device integrated at selected exterior sidewall locations of said pneumatic tire structure for providing lighted visual display on selected sidewall surfaces of said pneumatic tire structure;

a material layer applied over selected portions of said plurality of point light sources to diffuse the light emitting from said selected plurality of point light sources; and a network of fiber-optic branches provided between said plurality of point light sources and said material layer, wherein said at least one tire marking device comprises a plurality of point lights sources arranged in a predetermined array configuration.

* * * * *